(12) United States Patent
Esses

(10) Patent No.: US 7,524,052 B2
(45) Date of Patent: Apr. 28, 2009

(54) EYEGLASS FRAMES WITH DETACHABLE ORNAMENTS

(75) Inventor: Alfred Esses, Brooklyn, NY (US)

(73) Assignee: Pacific Eye Gear LLC, Long Island City, NY (US)

( * ) Notice: Subject to any disclaimer, the term of this patent is extended or adjusted under 35 U.S.C. 154(b) by 40 days.

(21) Appl. No.: 11/899,866

(22) Filed: Sep. 6, 2007

(65) Prior Publication Data
US 2009/0066908 A1  Mar. 12, 2009

(51) Int. Cl.
*G02C 11/02* (2006.01)
(52) U.S. Cl. ........................................ 351/52
(58) Field of Classification Search ............ 351/41, 351/51, 52; 63/1.11
See application file for complete search history.

(56) References Cited
U.S. PATENT DOCUMENTS
2,842,028 A * 7/1958 Belgard ..................... 351/52
4,884,883 A * 12/1989 Chappell ................... 351/52

* cited by examiner

*Primary Examiner*—Huy K Mai
(74) *Attorney, Agent, or Firm*—Ezra Sutton

(57) ABSTRACT

Ornamental eyewear with detachably mounted interchangeable ornaments mounted to at least one of the temple arms of an eyeglass frame. The eyeglass frame includes a pair of temple arms thereon; wherein each of the temple arms includes a temple arm wall. The temple arms include at least one hole opening within at least one of the temple arm walls of one of the temple arms for detachably mounting an ornament therein. The ornament includes a front wall surface in the form of an ornamental shape and includes a rear wall surface with a protrusion member on the rear wall surface of the ornament for detachably mounting and snap-fitting the ornament within the hole opening within the temple arm wall of the temple arm of the eyeglass frame. The protrusion member is in the form of a geometrically-shaped or non-geometrically-shaped protrusion member for detachably mounting and inserting within a geometrically-shaped or non-geometrically-shaped hole opening within one of the temple arm walls.

14 Claims, 5 Drawing Sheets

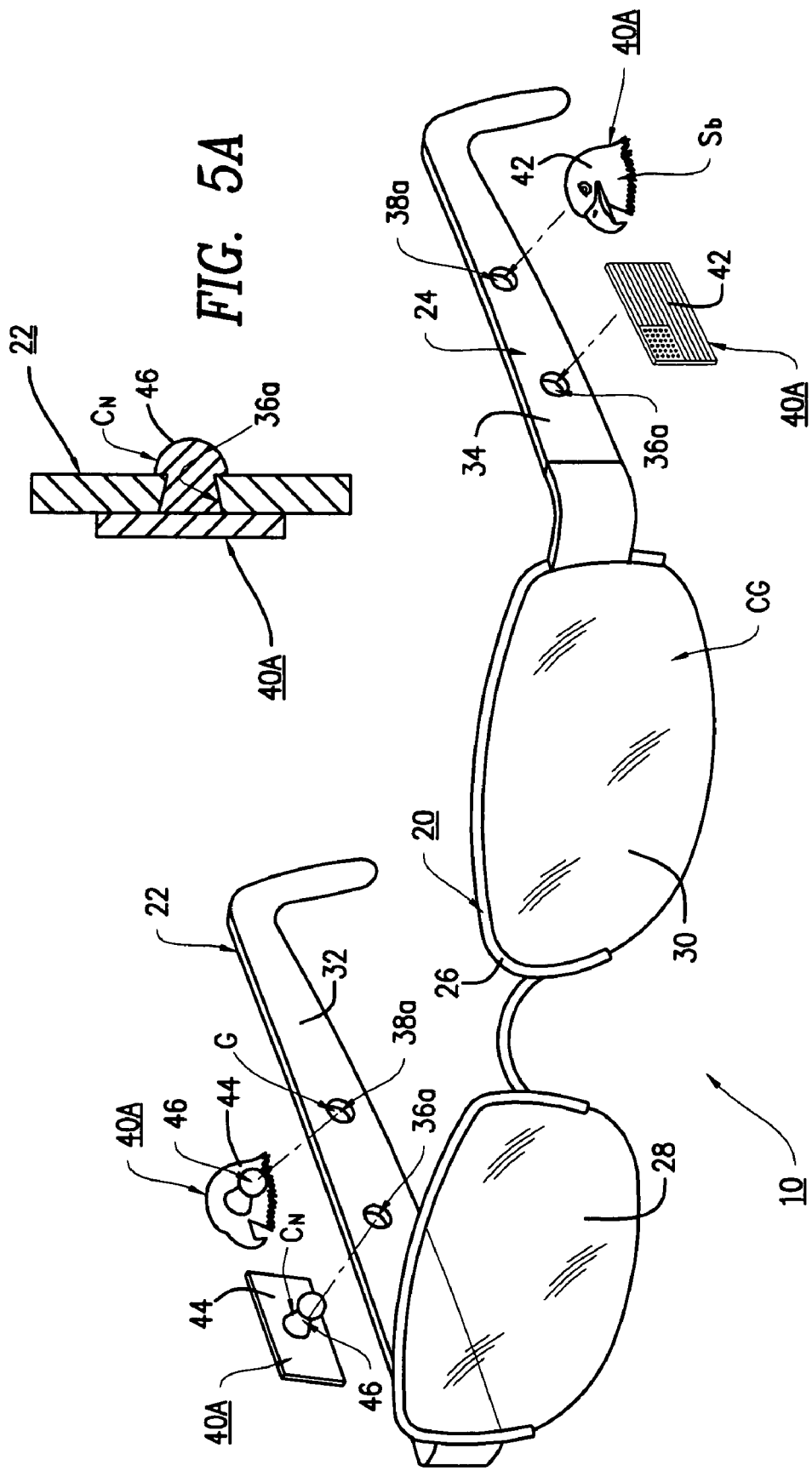

EYEGLASS FRAMES WITH DETACHABLE ORNAMENTS

FIELD OF THE INVENTION

The present invention relates to a pair of sunglasses and/or eyeglasses in which interchangeable ornaments can be detachably secured to each of the temple arms of the eyeglass frame. More particularly, the interchangeable ornament is detachably secured to the temple arm by snap-fastening the ornament through hole openings in the temple arms.

BACKGROUND OF THE INVENTION

It is well known in the prior art that eyewear provides for interchangeable ornaments positioned on the eyeglass frame, as well as on the temple arms of the eyeglass frame. These accessory structures have been mounted to the temple arms and to the eyeglass frame by having the ornament slidably mounted to the temple arms and/or eyeglass frame by O-rings, snap-on mounts, enclosure openings on the ornament, hooks, overlapping wrap-around rings, tie-downs, cinching and gripping members, elastic loops and the like.

The aforementioned mounting means in which the ornament is slidably mounted to the temple arm and/or to the bridge of the eyeglass frame does not securely mount the ornament to the temple arm and/or eyeglass frame, such that the ornament can move about the temple arm or dislodge itself from the temple arm and/or eyeglass frame.

There remains a need for an interchangeable ornament which is detachably secured to a temple arm by snap fastening the ornament through a predetermined hole opening within the temple arm of the eyeglass frame. Additionally, the interchangeable ornament is made of a single unitary construction having a geometrically-shaped tab insert on the rear wall of the ornament in order to detachably mount to the hole opening within the temple arm.

DESCRIPTION OF THE PRIOR ART

Eyeglasses, hatwear, footwear and clothing with detachable and integral ornaments and the like having various designs, configurations, structures and materials of construction have been disclosed in the prior art. For example, U.S. Pat. No. 6,520,635 to IGNATOWSKI discloses ornamental eyewear including a jewelry article adapted for attachment as an extension of the temple arm on conventional eyeglasses. The jewelry extension grips the temple arm with a quick release spring-biased clamp, and in turn supports one or more elongated strands of jewelry-type decorations such as beads, charms and other adornments. A decorative boss abuts one side of the spring-loaded clamp and extends beyond the jaws of the clamp to hide and provide visual balance to the attachment point. This prior art patent does not disclose or teach the specific structure of attaching decorative ornaments to each temple arm of the eyeglass frames by snap-fastening the ornament through hole openings within the temple arms of the frames.

U.S. Pat. No. 5,896,184 to LOWE et al. discloses an ornamental member for the temple arms of ordinary eyeglasses. In a first embodiment a resilient "O" ring is sized to grip the temple piece(s). An ornament of a selected shape or form is connected to the "O" ring via one or more links of a chain so that the ornament dangles and faces a selected orientation relative to the longitudinal length of the temple pieces. In a second embodiment, the "O" ring loosely fits the temple piece and a pair of temple piece gripping "O" rings are positioned on either side of the loosely fitting "O" ring to limit the free translation of the loose fitting "O" ring. Chain links are attached to the loose fitting "O" ring as previously mentioned and include a selected orientation ornament. This prior art patent does not disclose or teach the specific structure of attaching decorative ornaments to each temple arm of the eyeglass frames by snap-fastening the ornament through hole openings within the temple arms of the frames.

U.S. Pat. No. 5,024,515 to BECKEMEYER et al. discloses a device for readily attaching or detaching a decorative ornament to all types of plastic or wire eyeglass frames. The attaching device being an overlapping wrap-around ring of spring metal wire having the ends of the wire on the inside surface of the eyeglass frame formed to press on the frame to hold the ring in place. This prior art patent does not disclose or teach the specific structure of attaching decorative ornaments to each temple arm of the eyeglass frames by snap-fastening the ornament through hole openings within the temple arms of the frames.

U.S. Pat. No. 4,950,066 to HARTMAN discloses eyeglasses incorporating interchangeable functional and decorative elements affecting every aspect of the glasses, including the lenses, bridge and temples. All of the elements are readily demountable and reinsertable in operative relationship with one another to permit the rapid interchange of lenses and associated decorative elements to provide for functional accommodation and aesthetic variation. This prior art patent does not disclose or teach the specific structure of attaching decorative ornaments to each temple arm of the eyeglass frames by snap-fastening the ornament through hole openings within the temple arms of the frames.

Chinese Patent No. CN2,643,347Y to TANG discloses attaching decorative ornamental pieces to the temple arms of the eyeglass frames by snap-fitting the ornamental piece onto each of the temple arms of the frames. This prior art patent does not disclose or teach the specific structure of attaching decorative ornaments to each temple arm of the eyeglass frames by snap-fastening the ornament through hole openings within the temple arms of the frames.

U.S. Pat. No. 4,712,319 to GORIA discloses footwear with elastomeric or plastomeric soles such as boots, sports footwear or leisure footwear, having distinguishing elements or decorations attached to it. The elements comprise a flanged body held by means of a flexible retaining element, which may be part of the footwear itself, which has an aperture therein for allowing the body to be visible while retaining the flange. The elements may be reflective, fluorescent, phosphorescent or photoluminescent. This prior art patent does not disclose or teach the specific structure of attaching decorative ornaments to each temple arm of the eyeglass frames by snap-fastening the ornament through hole openings within the temple arms of the frames.

U.S. Patent Publication No. 2007/0006502 to SCHMELZER et al. discloses a system and method for securing accessories to shoes and other articles of clothing is described. One illustrative embodiment is a system for attaching a decorative accessory to a shoe. This system comprises a shaft having first and second ends. A first shoulder is secured to the first end of the shaft and is configured for insertion through an expandable hold in an upper portion of the shoe and configured to engage an inner surface of the upper portion of the shoe. A second shoulder is secured to the second end of the shaft and is configured to engage the shoe. A third shoulder adjacent to the second shoulder comprises the decorative accessory. This prior art patent does not disclose or teach the specific structure of attaching decorative ornaments to each temple arm of the eyeglass frames by snap-fastening the ornament through hole openings within the temple arms of the frames.

None of the aforementioned prior art patents and publications teach or disclose eyewear having interchangeable ornaments that can be detachably secured to each temple arm of an eyeglass frame such that the interchangeable ornament is detachably secured to the temple arm by snap-fastening the ornament through hole openings in the temple arms.

Accordingly, it is an object of the present invention to provide an interchangeable ornament that is detachably secured to a temple arm by snap-fastening the ornament through a hold opening in a wall of the temple area.

Another object of the present invention to provide an interchangeable ornament for use on eyeglasses or sunglasses that can be detachably secured to each of the temple arms of the eyewear frames for giving an aesthetically pleasing look to the decorated eyewear.

Another object of the present invention to provide an interchangeable ornament for eyewear such that ornaments may be in the form of a flower, an insect, a bird, an animal, a fish, a tree, a number, a caricature, a geometric design, a non-geometric design and the like.

Another object of the present invention to provide an interchangeable ornament that is made of a single unitary construction having a geometrically-shaped tab insert or protrusion member integrally mounted to a rear wall of the ornament in order to detachably mount to a geometrically-shaped hole opening within the wall of the temple arm.

Another object of the present invention to provide a geometrically-shaped hole opening in the wall of the temple arm such that the hole opening may be in the form of a triangle, a circle, a square, a rectangle, a trapezoid, an oval, an octagon, a pentagon and the like.

Another object of the present invention to provide an interchangeable ornament that is made from durable plastics, metals, different types of wood and wood products, and precious stones.

Another object of the present invention to provide an interchangeable ornament for eyewear that is easy to assemble to the temple arm, durable for long use, cleanable for repeated use and replaceable if broken or lost.

A further object of the present invention to provide an interchangeable ornament for eyewear that can be mass-produced in an automated and economical manner and is readily affordable by the consumer.

SUMMARY OF THE INVENTION

In accordance with the present invention, there is provided ornamental eyewear with detachably mounted interchangeable ornaments mounted to at least one of the temple arms of an eyeglass frame. The eyeglass frame includes a pair of temple arms thereon, wherein each of the temple arms includes a temple wall. The temple arms include at least one hole opening within at least one of the temple arms walls of one of the temple arms for detachably mounting an ornament therein. The ornament includes a front wall surface in the form of an ornamental shape and includes a rear wall surface with a protrusion member on the rear wall surface of the ornament for detachably mounting and snap-fitting the ornament within the hole opening with the temple arm wall of the temple arm of the eyeglass frame. The protrusion member is in the form of a geometrically-shaped or non geometrically-shaped protrusion member for detachably mounting an inserting within a geometrically-shaped or non geometrically-shaped hole opening within one of the temple arm walls.

BRIEF DESCRIPTION OF THE DRAWINGS

Further objects, features and advantages of the present invention will become apparent upon the consideration of the following detailed description of the presently preferred embodiment when taken in conjunction with the accompanying drawings, wherein:

FIG. 3 is an enlarged front perspective view of the detachable ornament of the present invention showing a front wall surface of the detachable ornament having an ornamental shape thereon;

FIG. 4 is an enlarged perspective view of the detachable ornament of the present invention showing a rear wall having a geometrically-shaped protrusion member or tab insert for detachably mounting to a geometrically-shaped hole opening in the temple arm;

FIG. 5 is an exploded perspective view of the eyeglasses with detachable ornaments of an alternate design of the present invention showing an alternate detachable ornament being detachably mounted to an alternate hole opening shape within each of the temple arms of the eyeglass frames;

FIG. 5A is a cross-sectional view of the detachable ornament of the present invention showing the rear wall having a conically-shaped, mushroom tipped protrusion member, for insertably fitting into a tapered hole opening;

DETAILED DESCRIPTION OF THE PREFERRED EMBODIMENT 10

Figure 1:
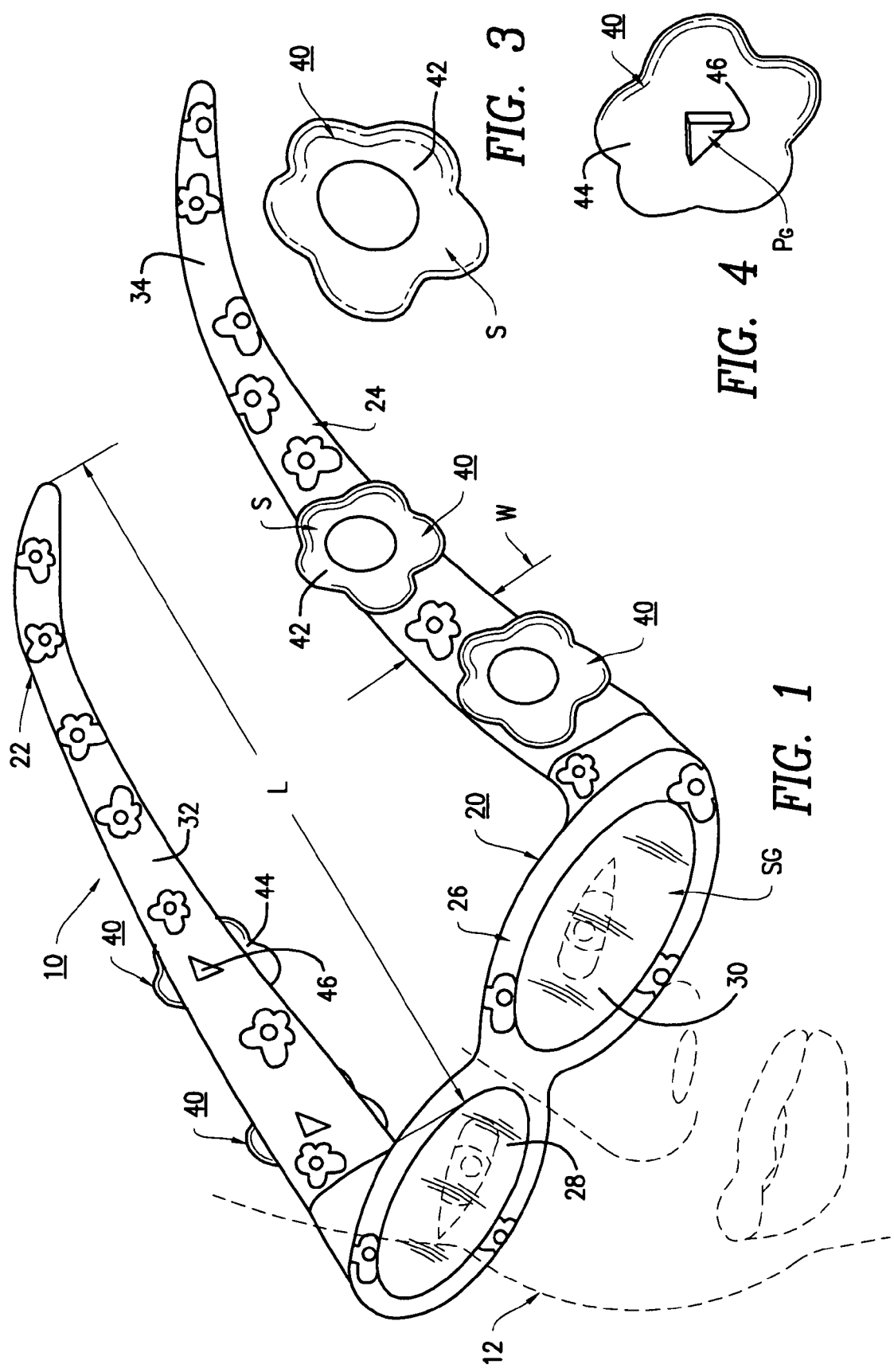
FIG. 1 is a perspective view of the eyeglasses with detachable ornaments of the present invention of the preferred embodiment showing a pair of temple arms having detachable ornaments mounted within each of the temple arms in an assembled state and in a fully operational mode.
Figure 2:
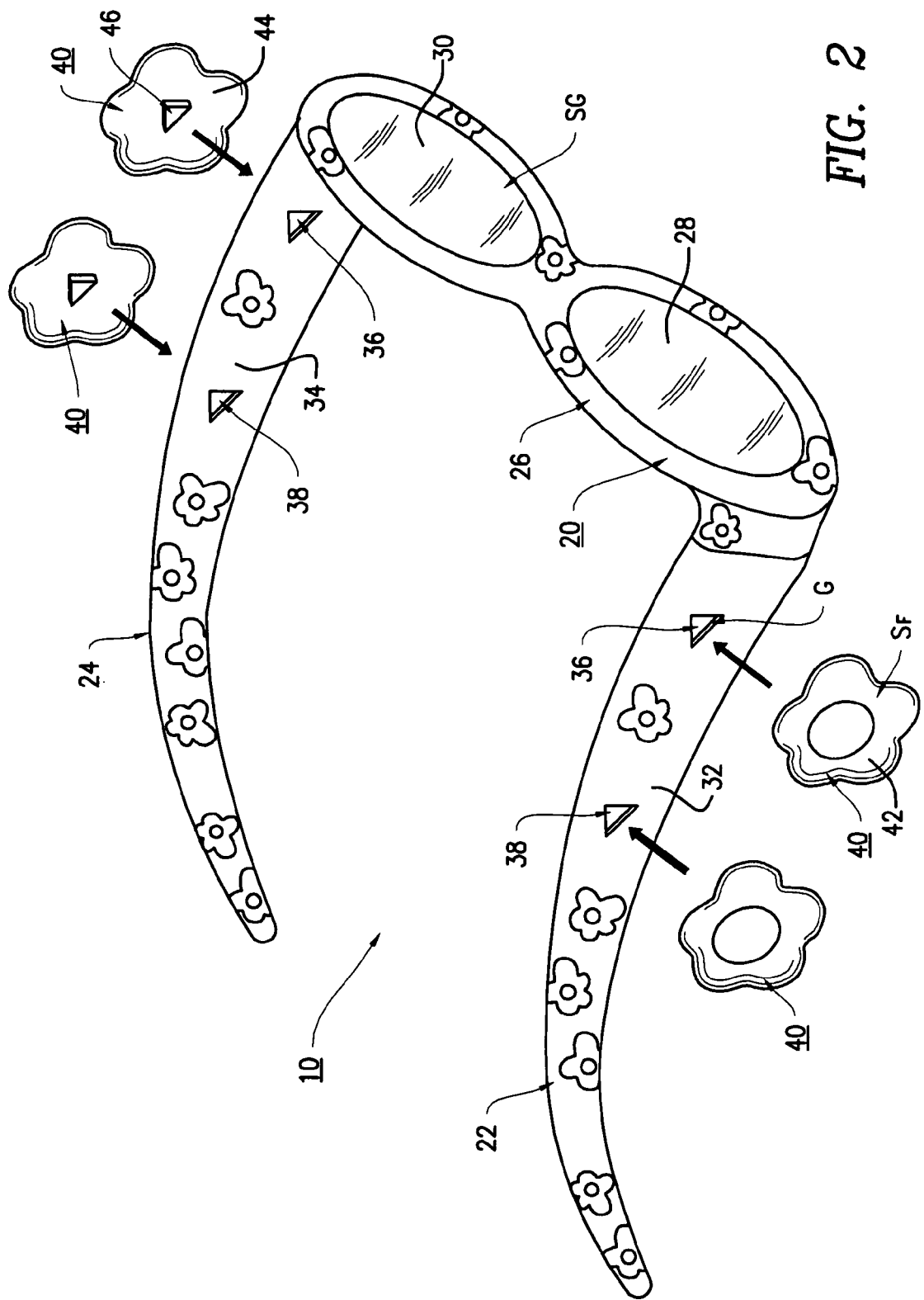
FIG. 2 is an exploded perspective view of the eyeglasses with detachable ornaments of the present invention showing detachable ornaments being detachably mounted to hole openings within each of the temple arms of the eyeglass frames.

The eyeglass frame 10 having detachable and interchangeable ornaments 40 thereon of the preferred embodiment of the present invention is represented in detail by FIGS. 1 through 7 of the patent drawings. The interchangeable ornaments 40 are detachably secured to each of the temple arms 22 and 24 of an eyeglass frame 10, as shown in FIGS. 1 and 2. The eyeglass frame 10 is made from durable plastics or lightweight metals. The eyeglass frame 10 may be in the form of sunglasses SG or conventional clear eyeglasses CG, as shown in FIGS. 1 and 5, respectively.

The eyeglass frame 10 includes a frame housing 20 having a pair of temple arms 22 and 24 connected to an eyeglass bridge member 26 with eyeglasses 28 and 30 therein. Each of the temple arms 22 and 24 include temple arm walls 32 and 34 thereto. Each of the temple arm walls 32 and 34 include at least one hole opening 36 therethrough. As shown in FIG. 2, there are at least two spaced-apart hole openings 36 and 38 therethrough in each of the temple arm walls 32 and 34, respectively. Each of the hole openings 36 and 38 in temple arm walls 32 and 34 are for detachably mounting the interchangeable ornaments 40 therein. The hole openings 36 and 38 within each of the temple arm walls 32 and 34 of temple arms 22 and 24 are in the form of geometrically-shaped hole openings G or non geometrically-shaped hole openings NG, a shown in FIGS. 5, 6 and 7 of the drawings. The geometrically-shaped hole openings G in the temple arm walls 32 and 34 are in the form of a triangle, a circle, an oval, a square, a star, a rectangle, a trapezoid, an octagon, a pentagon or other polygonal shapes. The non geometrically-shaped hole openings NG in the temple arm walls 32 and 34 are in the form of a heart, a crescent moon, a cloud, a number, a letter and the like, as depicted in FIG. 7. It is understood that each of the temple arm walls 32 and 34 are of sufficient width W to allow the hole openings 36 and 38 to be drilled, stamped out, etc. within each of the temple arm walls 32 and 34 of temple arms 22 and 24, respectively, for either of the geometrically-shaped hole openings G or the non geometrically-shaped hole openings NG. Further, each of the temple arm walls 32 and 34 of temple arms 22 and 24 are of sufficient length L to accommodate at least two spaced-apart hole openings 36 and 38 therethrough.

The interchangeable ornament 40, as shown in FIGS. 3 and 4 of the drawings, includes a front wall surface 42 in the form of an ornamental shape S and a rear wall surface 44 having a protrusion member 46 integrally attached thereto. The ornamental shape S may be in the form of a flower, an insect, a bird, an animal, a fish, a tree, a number, a coin, a caricature, a flag, an airplane, a geometric design, a non-geometric design and the like. The protrusion member 46 on rear wall surface 44 may be in the form of a geometrically-shaped protrusion $P_G$ or a non geometrically-shaped protrusion $P_{NG}$. The geometrically-shaped protrusion may be in the form of a triangle, a circle, an oval, a square, a rectangle, a trapezoid, a star, an octagon, a pentagon, or other polygonal shapes. The non geometrically-shaped protrusion $P_{NG}$ may be in the form of a heart, a crescent moon, a cloud, a number, a letter, and the like. Also, the protrusion member 46 on rear wall surface 44 is centrally positioned on the rear wall surface 44 of the interchangeable ornament 40, as depicted in FIG. 4 of the patent drawings.

Figure 6:
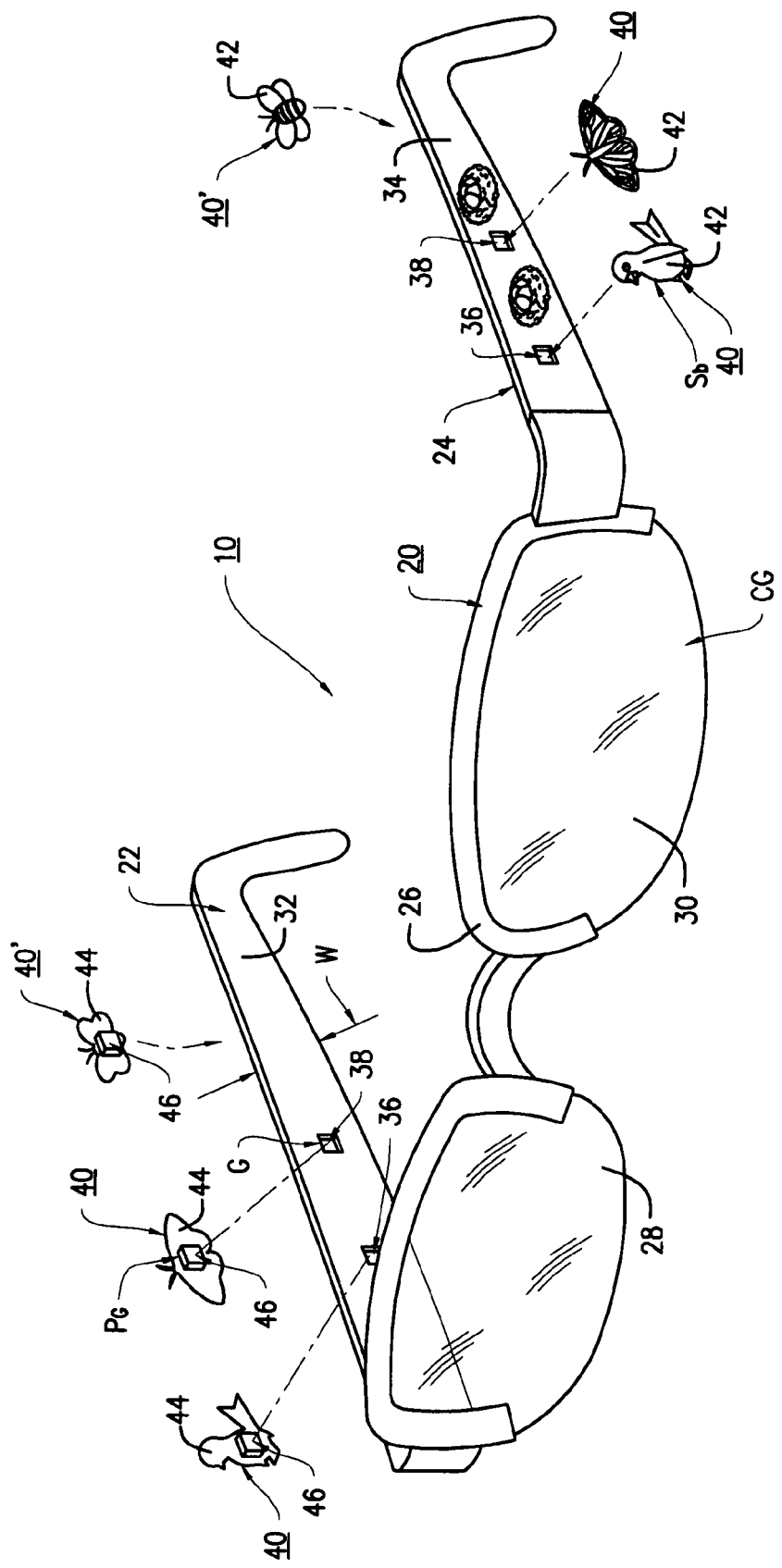
FIG. 6 is an exploded perspective view of the eyeglasses with detachable ornaments of a further alternate design of the present invention showing another alternate detachable ornament being detachably mounted to another alternate hole opening shape within each of the temple arms of the eyeglass frames.
Figure 7:
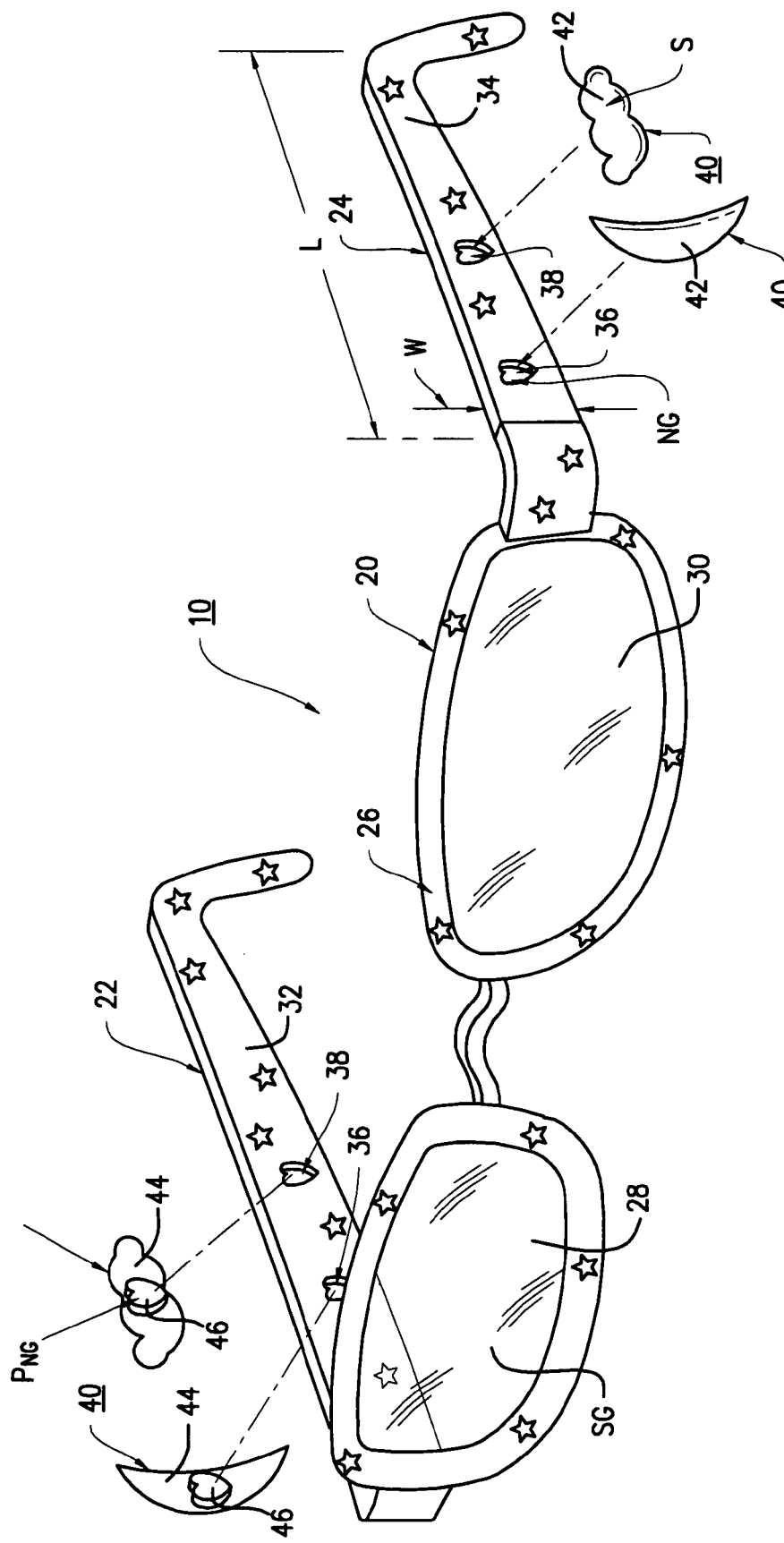
FIG. 7 is an exploded perspective view on the eyeglasses with detachable ornaments of another alternate design of the present invention showing a further alternate detachable ornament being detachably mounted to another alternate non-geometrically-shaped openings with each of the temple arms of the eyeglass frames.

As shown in FIGS. 2, 5 and 6 of the drawings, the protrusion member 46 on rear wall surface 44 or ornament 40 is detachably mounted and snap-fitted within the hole opening 36 and/or 38 on the temple arm wall 32 and/or 34 of temple arm 22 and/or 24, respectively, of frame housing 20. It is understood the protrusion member 46 is flush with the temple arm wall 32 and/or 34 after insertion of the protrusion member 46 within the temple arm wall 32 and/or 34, as shown in FIG. 1 of the drawings, such that protrusion member 46 would not chafe the wearer 12 when using the eyeglass frame 10.

In an alternate design, the interchangeable ornaments 40A, as shown in FIG. 5A, includes a protrusion member 46a integrally attached to the rear wall surface 44, wherein the protrusion member 46a has a conical shape $C_N$ with a mushroom tip for detachably fitting into a tapered hole openings 36a and 38a, accordingly.

Operation of the Present Invention

As shown in FIGS. 2, 5, 6 and 7 of the drawings, the eyeglass frame 10 with detachable and interchangeable ornaments 40 are assembled and operated in the following manner: The user 12 initially starts the assembly process by mounting and inserting the protrusion member 46 of interchangeable ornament 40 within hold openings 36 and 38 of temple arms walls 32 and 34 of temple arms 22 and 24, respectively. After snap-fitting the protrusion member 46 of ornament 40 within hole openings 36 and 38, as depicted in FIG. 1, the protrusion member 46 is in a flush orientation with the temple arm walls 32 and 34, such that the protrusion member 46 would not chafe the wearer's head 14 of user 12 when using the assembled eyeglass frame 10, as shown in FIG. 1 of the patent drawings.

It is understood that the user 12 can change the interchangeable ornament 40; for example, a flower-shaped ornament $S_f$ with a bird-shaped ornament $S_b$ by removing the first ornament 40 from hole opening 38 and replacing the second ornament 40' within hole opening 38, as shown in FIG. 5 of the patent drawings.

Advantages of the Present Invention

Accordingly, an advantage of the present invention is that it provides for an interchangeable ornament that is detachably secured to a temple arm by snap-fastening the ornament through a hold opening in a wall of the temple area.

Another advantage of the present invention is that it provides for an interchangeable ornament for use on eyeglasses or sunglasses that can be detachably secured to each of the temple arms of the eyewear frames for giving an aesthetically pleasing look to the decorated eyewear.

Another advantage of the present invention is that it provides for an interchangeable ornament for eyewear such that ornaments may be in the form of a flower, an insect, a bird, an animal, a fish, a tree, a number, a caricature, a geometric design, a non-geometric design and the like.

Another advantage of the present invention is that it provides for an interchangeable ornament that is made of a single unitary construction having a geometrically-shaped tab insert or protrusion member integrally mounted to a rear wall of the ornament in order to detachably mount to a geometrically-shaped hole opening within the wall of the temple arm.

Another advantage of the present invention is that it provides for a geometrically-shaped hole opening in the wall of the temple arm such that the hole opening may be in the form of a triangle, a circle, a square, a rectangle, a trapezoid, an oval, an octagon, a pentagon and the like.

Another advantage of the present invention is that it provides for an interchangeable ornament that is made from durable plastics, metals, different types of wood and wood products, and precious stones.

Another advantage of the present invention is that it provides for an interchangeable ornament for eyewear that is easy to assemble to the temple arm, durable for long use, cleanable for repeated use and replaceable if broken or lost.

A further advantage of the present invention is that it provides for an interchangeable ornament for eyewear that can be mass-produced in an automated and economical manner and is readily affordable by the consumer.

A latitude of modification, change and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein.

What is claimed is:

1. Ornamental eyewear with detachably mounted interchangeable ornaments mounted to at least one of the temple arms of an eyeglass frame, comprising:
    a) an eyeglass frame having a pair of temple arms thereon; wherein each of said temple arms includes a temple arm wall;
    b) said temple arms having at least one hole opening within at least one of said temple arm walls of one of said temple arms for detachably mounting an ornament therein;
    c) said ornament having a front wall surface in the form of an ornamental shape and having a rear wall surface with a protrusion member on said rear wall surface of said ornament for detachably mounting and snap-fitting said ornament within said hole opening within said temple arm wall of said temple arm of said eyeglass frame; and
    d) said protrusion member being in the form of a geometrically-shaped or non-geometrically-shaped protrusion member for detachably mounting and inserting within a geometrically-shaped or non-geometrically-shaped hole opening within one of said temple arm walls.

2. A eyeglass frame in accordance with claim 1, wherein said ornament is an interchangeable ornament for detachably mounting within said hole opening with a different interchangeable ornament.

3. A eyeglass frame in accordance with claim 2, wherein said interchangeable ornament is made from durable plastics, metals, different kinds of woods and wood products and precious stones.

4. A eyeglass frame in accordance with claim 1, wherein said geometrically-shaped protrusion member is in the form of a triangle, a circle, an oval, a square, a rectangle, a trapezoid, an octagon, a pentagon and other polygonal shapes.

5. A eyeglass frame in accordance with claim 1, wherein said geometrically-shaped hole opening in said temple arm wall is in the form of a triangle, a circle, an oval, a square, a rectangle, a trapezoid, an octagon, a pentagon, a tapered conically-shaped and other polygonal shapes.

6. A eyeglass frame in accordance with claim 1, wherein said non-geometrically-shaped protrusion member is in the form of a heart, a crescent moon, a cloud, a mushroom, a number, a letter or other non-polygonal shapes.

7. A eyeglass frame in accordance with claim 1, wherein said non-geometrically-shaped hole opening in said temple arm wall is in the form of a crescent moon, a cloud, a number, a letter or other non-polygonal shapes.

8. A eyeglass frame in accordance with claim 1, wherein said ornament is of a single unitary construction.

9. A eyeglass frame in accordance with claim 1, wherein said interchangeable ornament is in the form of a flower, an insect, a bird, an animal, a fish, a tree, a number, a coin, a caricature, an airplane, a flag, a geometric design, and a non-geometric design.

10. A eyeglass frame in accordance with claim 1, wherein said temple arm wall is of a sufficient width to allow said hole opening within said temple arm wall.

11. A eyeglass frame in accordance with claim 1, wherein said temple arm wall includes at least two spaced-apart hole openings.

12. A eyeglass frame in accordance with claim 1, wherein said temple arm wall is of sufficient length to accommodate said at least two spaced-apart hole openings.

13. A eyeglass frame in accordance with claim 1, wherein said eyeglass frame is made from durable plastics or lightweight metals.

14. A eyeglass frame in accordance with claim 1, wherein said protrusion member is in a flush orientation with said temple arm wall after mounting and inserting of said protrusion member within said hole opening on said temple arm wall, such that said protrusion member would not chafe the wearer's head when using said eyeglass frame in an operational mode.

* * * * *